US 9,250,886 B2

(12) United States Patent
Gnech et al.

(10) Patent No.: US 9,250,886 B2
(45) Date of Patent: Feb. 2, 2016

(54) OPTIMIZING PROVISIONING WORKFLOWS IN CLOUD COMPUTING

(75) Inventors: Thomas H. Gnech, Boeblingen (DE); Regina Illner, Boeblingen (DE); Steffen Koenig, Boeblingen (DE); Oliver Petrik, Boeblingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 892 days.

(21) Appl. No.: 13/528,006

(22) Filed: Jun. 20, 2012

(65) Prior Publication Data

US 2013/0007244 A1 Jan. 3, 2013

(30) Foreign Application Priority Data

Jul. 1, 2011 (EP) .................................... 11172329

(51) Int. Cl.
G06F 9/455 (2006.01)
G06F 9/445 (2006.01)
G06F 9/50 (2006.01)

(52) U.S. Cl.
CPC .... G06F 8/61 (2013.01); G06F 9/50 (2013.01)

(58) Field of Classification Search
None
See application file for complete search history.

(56) References Cited

U.S. PATENT DOCUMENTS

| 8,032,846 B1* | 10/2011 | Balasubramanian et al. | 716/100 |
| 2004/0122699 A1* | 6/2004 | Brito et al. | 705/1 |
| 2009/0089078 A1* | 4/2009 | Bursey | 705/1 |
| 2010/0042720 A1 | 2/2010 | Stienhans et al. | |
| 2010/0153482 A1 | 6/2010 | Kim et al. | |
| 2010/0169477 A1 | 7/2010 | Stienhans et al. | |
| 2012/0331149 A1* | 12/2012 | Rao | 709/226 |

FOREIGN PATENT DOCUMENTS

WO  2010023139 A1  3/2010

OTHER PUBLICATIONS

Bi, Jing et al., "Dynamic Provisioning Modeling for Virtualized Multi-tier Applications in Cloud Data Center", 2010 IEEE 3rd International Conference on Cloud Computing, pp. 370-377 (Mar. 2010).
Zhu, Qian et al., "Resource Provisioning with Budget Constraints for Adaptive Applications in Cloud Environments", Department of Science and Engineering, Ohio State University, 4 pages (Mar. 2012).

* cited by examiner

*Primary Examiner* — Kenneth Tang
(74) *Attorney, Agent, or Firm* — William A. Kinnaman, Jr., Esq.; Kevin P. Radigan, Esq.; Heslin Rothenberg Farley & Mesiti P.C.

(57) ABSTRACT

A method for optimizing provisioning workflows in cloud computing is provided. The method comprises determining a time coefficient for each resource type or aggregated resource types which define the installation time of a current workflow; accessing the current workflow and creating a tree topology based on the current workflow which defines serialized and parallelized provisioning steps; dividing the tree topology into independent sub-paths; determining a timing condition for an execution time of an optimized workflow; creating an optimized workflow template maintaining the timing condition by: selecting cheapest installation methods and cheapest resources; and reducing the parallelization of the tree topology; creating the optimized workflow by merging the optimized workflow template with data and the resource types of the current workflow.

14 Claims, 8 Drawing Sheets

OPTIMIZING PROVISIONING WORKFLOWS IN CLOUD COMPUTING

PRIOR FOREIGN APPLICATION

This application claims priority from European patent application number 11172329.2, filed Jul. 1, 2011, which is hereby incorporated herein by reference in its entirety.

TECHNICAL FIELD

The present invention relates in general to the field of cloud management systems, and in particular to a method for optimizing provisioning workflows in cloud computing and a system for optimizing provisioning workflows in cloud computing. Still more particularly, the present invention relates to a data processing program and a computer program product for optimizing provisioning workflows in cloud computing.

BACKGROUND

Prior art resource provisioning environments comprise provisioning systems which deliver a consumer system on request of a consumer. Such provisioning systems run provisioning tools on provisioning servers which utilize resource pools for hardware and software components by executing a pre-defined provisioning workflow from a workflow repository. Each single provisioning workflow of those prior art provisioning workflows, describes a unique target consumer system topology plus the rules how to build the consumer system from the provisioning resources. Utilizing different approaches to provision a certain unique consumer system in an optimized way requires pre-defined variations of the provisioning workflow.

Resource provisioning response time ("request-to-deliver") is an important differentiating feature for cloud resource providers. Pre-defined prior art provisioning workflows cannot be adapted to the fastest provisioning method at run-time. Instead, a high volume of pre-defined provisioning workflow variations for the same target consumer system topology have to be developed. Further, runtime system conditions (e.g. network throughput) are not considered, since the provisioning workflows are pre-defined, and variations are selected on a "best-guess" basis.

In the Patent Application Publication US 2010/0153482 A1 "CLOUD-BASED AUTOMATION OF RESOURCES" by Kim et al. an IT administration workstation is disclosed, which hosts a workflow authoring application (e.g., Citrix Workflow Studio or Microsoft Visual Studio®), a console application which includes a workflow conversion engine and a management dashboard application. An IT administrator runs the workflow authoring application in conjunction with activity libraries to author a workflow composed of a collection of individual activities from the activity libraries and then test a workflow that defines provisioning or tear down of a VM host, storage area network (SAN), other network device or application services running on those VMs.

Today's resource provisioning systems execute pre-defined workflows without adapting those workflows to the circumstances at invocation time. The resource provisioning response time is an important unique or differentiating feature for cloud resource providers but not considered, yet. Just doing the provisioning job will not improve provisioning response time (static process), thus, will not offer better request-to-deliver time.

BRIEF SUMMARY

In accordance with an aspect of the present invention, a method is provided for optimizing provisioning workflows in cloud computing. The method includes: determining a time coefficient for each resource type or aggregated resource types which define the installation time of a current workflow; accessing the current workflow and creating a tree topology based on the current workflow which defines serialized and parallelized provisioning steps; dividing the tree topology into independent sub-paths; determining a timing condition for an execution time of an optimized workflow; creating an optimized workflow template maintaining the timing condition by: selecting cheapest installation methods and cheapest resources; and reducing the parallelization of the tree topology; creating the optimized workflow by merging the optimized workflow template with data and the resource types of the current workflow.

In aspect, a system for optimizing provisioning workflows in cloud computing is provided. The system includes a provisioning server with a provisioning tool, a workflow repository storing at least one workflow, a hardware resource pool comprising at least one hardware resource, a software resource pool comprising at least one software resource and a provisioning system extension comprising a tool set of at least one installation method, an adaptive workflow optimizer, and a static and dynamic performance statistic data collector. The static and dynamic performance statistic data collector determines a time coefficient for each resource type or aggregated resource types which define the installation time of a current workflow. The adaptive workflow optimizer accesses the current workflow and creates a tree topology based on the current workflow which defines serialized and parallelized provisioning steps, divides the tree topology into independent sub-paths, determines a timing condition for an execution time of an optimized workflow; creates an optimized workflow template; and maintains the timing condition by selecting cheapest installation methods from the tool set of at least one installation method, selecting cheapest resources from the hardware resource pool and the software resource pool, and reduces the parallelization of the tree topology. The adaptive workflow optimizer stores the optimized workflow template in an optimized workflow template library, and the adaptive workflow optimizer creates the optimized workflow by merging the optimized workflow template with data and the resource types of the current workflow.

In a further aspect, a computer program product for optimizing provisioning workflows in cloud computing is provided. The computer program product includes a computer-readable storage medium readable by a processor and storing instructions for execution by the processor for performing a method. The method includes: determining a time coefficient for each resource type or aggregated resource types which define the installation time of a current workflow; accessing the current workflow and creating a tree topology based on the current workflow which defines serialized and parallelized provisioning steps; dividing the tree topology into independent sub-paths; determining a timing condition for an execution time of an optimized workflow; creating an optimized workflow template maintaining the timing condition by: selecting cheapest installation methods and cheapest resources; and reducing the parallelization of the tree topology; creating the optimized workflow by merging the optimized workflow template with data and the resource types of the current workflow.

The above, as well as additional purposes, features, and advantages of the present invention will become apparent in the following detailed written description.

BRIEF DESCRIPTION OF THE SEVERAL VIEWS OF THE DRAWINGS

One or more embodiments of the present invention, as described in detail below, are shown in the drawings, in which.

DETAILED DESCRIPTION

The technical problem underlying the present invention is to provide a method for optimizing provisioning workflows in cloud computing and a system for optimizing provisioning workflows in cloud computing, which are able to assemble a resource provisioning workflow adapted to the circumstances at invocation time and to solve the above mentioned shortcomings and pain points of prior art provisioning workflows in cloud computing.

According to the present invention this problem is solved by providing a method for optimizing provisioning workflows in cloud computing having the features of claim 1, a system for optimizing provisioning workflows in cloud computing having the features of claim 9, and a computer program product for optimizing provisioning workflows in cloud computing having the features of claim 14. Advantageous embodiments of the present invention are mentioned in the subclaims.

Accordingly, in an embodiment of the present invention, a method for optimizing provisioning workflows in cloud computing, comprises: determining a time coefficient for each resource type or aggregated resource types which define the installation time of a current workflow; accessing the current workflow and creating a tree topology based on the current workflow which defines serialized and parallelized provisioning steps; dividing the tree topology into independent sub-paths; determining a timing condition for an execution time of an optimized workflow; creating an optimized workflow template maintaining the timing condition by: selecting cheapest installation methods and cheapest resources; and reducing the parallelization of the tree topology; creating the optimized workflow by merging the optimized workflow template with data and the resource types of the current workflow.

In further embodiments of the present invention, a first timing condition for an execution time of an optimized workflow is determined as final optimized workflow execution time.

In further embodiments of the present invention, the first timing condition for an execution time of an optimized workflow is determined by the steps of: Applying fastest installation method to each independent sub-path; applying shortest provisioning time for each resource type; and identifying a time-wise longest undividable sub-path at a maximum of the parallelization of the tree topology defining the final optimized workflow execution time.

In further embodiments of the present invention, a second timing condition for an execution time of an optimized workflow is determined as optimized workflow execution time defined by a contract.

In further embodiments of the present invention, a time-wise longest undividable sub-path is identified maintaining the second timing condition for an execution time of an optimized workflow.

In further embodiments of the present invention, the time coefficient for each resource type or aggregated resource types is derived and collected as static and dynamic performance data.

In further embodiments of the present invention, the static performance data is collected by manually input of pre-defined data and/or by performing explicit measurements of workflow execution time.

In further embodiments of the present invention, long-term dynamic data are collected by using monitoring techniques to obtain time-coefficients of components during regular operation; and short-term performance data are collected by using monitoring techniques to obtain network bandwidth, throughput or CPU load during current operation.

In another embodiment of the present invention, a system is provided for optimizing provisioning workflows in cloud computing. The system comprises a provisioning server with a provisioning tool, a workflow repository storing at least one workflow, a hardware resource pool comprising at least one hardware resource, a software resource pool comprising at least one software resource and a provisioning system extension comprising a tool set of at least one installation method, an adaptive workflow optimizer, and a static and dynamic performance statistic data collector; wherein the static and dynamic performance statistic data collector determines a time coefficient for each resource type or aggregated resource types which define the installation time of a current workflow; wherein the adaptive workflow optimizer accesses the current workflow and creates a tree topology based on the current workflow which defines serialized and parallelized provisioning steps; divides the tree topology into independent sub-paths; determines a timing condition for an execution time of an optimized workflow; creates an optimized workflow template; and maintains the timing condition by selecting cheapest installation methods from the tool set of at least one installation method; selecting cheapest resources from the hardware resource pool and the software resource pool; and reducing the parallelization of the tree topology; wherein the adaptive workflow optimizer stores the optimized workflow template in an optimized workflow template library, and wherein the adaptive workflow optimizer creates the optimized workflow by merging said optimized workflow template with data and the resource types of the current workflow.

In further embodiments of the present invention, the adaptive workflow optimizer determines a first timing condition for an execution time of an optimized workflow as final optimized workflow execution time by applying fastest installation method to each independent sub-path; applying shortest provisioning time for each resource; and identifying a timewise longest undividable sub-path at a maximum of the parallelization of the tree topology defining the final optimized workflow execution time.

In further embodiments of the present invention, the adaptive workflow optimizer determines a second timing condition for an execution time of an optimized workflow as optimized workflow execution time defined by a contract, wherein the adaptive workflow optimizer identifies a timewise longest undividable sub-path maintaining the second timing condition for an execution time of an optimized workflow.

In further embodiments of the present invention, the static and dynamic performance statistic data collector derives and collects the time coefficient for each resource type or aggregated resource types as static and dynamic performance data, wherein the static and dynamic performance statistic data collector stores the static and dynamic performance data in a static and dynamic performance statistic data library.

In further embodiments of the present invention, the static and dynamic performance statistic data collector collects the static performance data as manually input pre-defined data and/or by performing explicit measurements of workflow execution time, wherein the static and dynamic performance statistic data collector collects long-term dynamic data by using monitoring techniques to obtain time-coefficients of components during regular operation; and wherein the static and dynamic performance statistic data collector collects short-term performance data by using monitoring techniques to obtain network bandwidth, throughput or CPU load during current operation.

In another embodiment of the present invention, a data processing program for execution in a data processing system comprises software code portions for performing a method for optimizing provisioning workflows in cloud computing when the program is run on the data processing system.

In yet another embodiment of the present invention, a computer program product stored on a computer-usable medium, comprises computer-readable program means for causing a computer to perform a method for optimizing provisioning workflows in cloud computing when the program is run on the computer.

All in all, embodiments of the present invention employ dynamic processes which assemble resource provisioning workflows adapted to the circumstances at invocation time.

An idea of the present invention is to optimize automated resource provisioning by performing a topological analysis of the selected provisioning workflow and by restructuring that workflow in a way that a minimized "request-to-deliver" elapsed execution time ("request-to-deliver") is yielded. Besides the workflow topology, embodiments of the present invention consider specific resource characteristics, e.g. timing coefficients, and other influences, and adapt those to the workflow restructuring as they are at the immediate execution time. At the same time of cutting down the "request-to-deliver" time, embodiments of the present invention improve the resource consumption for the restructured workflow, too.

Embodiments of the present invention employ a method which optimizes timing and resource usage of a provisioning workflow right before its execution, such that workflow runtime and resource usage are minimized.

In another embodiment, optimization is done within the limits of a contractual obligation, like a service level agreement (SLA). In this case, resource usage might be further optimized by increasing the workflow runtime but maintaining a workflow execution time, defined by a contract.

Embodiments of the present invention extend a provisioning system by a tool set of installation methods, by a library for static and dynamic performance statistic data (SDPS), by a library for optimized workflow templates (OWT), by an adaptive workflow optimizer (AWO), and by a collector for static and dynamic performance statistic data. Further the provisioning system includes resource pools, pre-defined workflows in workflow repository, all connected over a network. The provisioning server runs provisioning tool which utilizes the other components over the network. The static and dynamic performance statistic data library contains time coefficients of each resource type and aggregated resource types, of the installation methods, of the workflows, and of the current running system (e.g., network bandwidth and throughput, CPU load).

Figure 1:
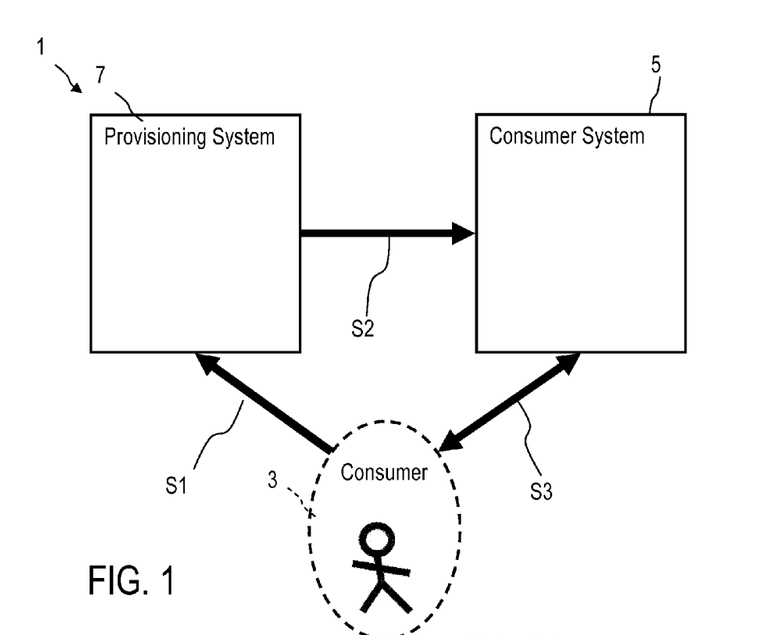
FIG. 1 is a schematic block diagram of a resource provisioning environment, in accordance with an embodiment of the present invention.
Figure 2:
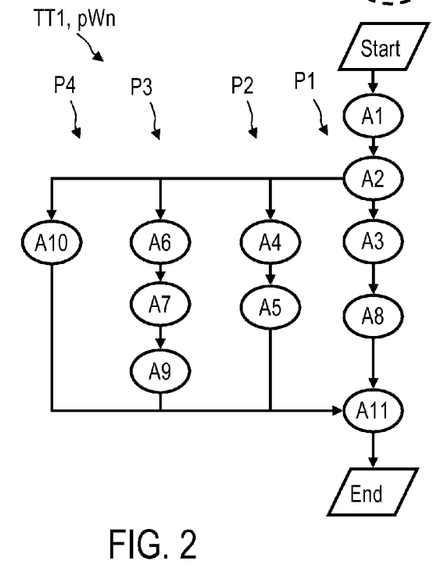
FIG. 2 is a schematic diagram of a topology tree of an exemplary provisioning workflow.
Figure 3:
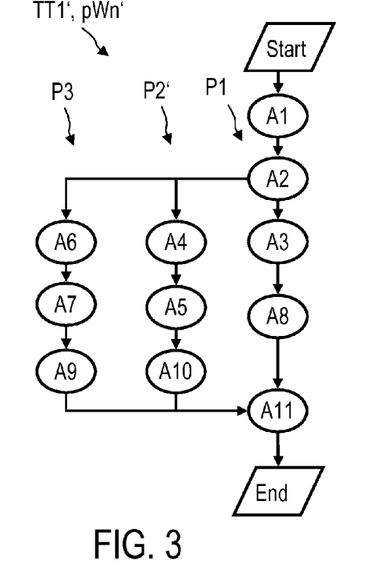
FIG. 3 is a schematic diagram of a topology tree of an optimized workflow created from the exemplary provisioning workflow shown in FIG. 2.
Figure 4:
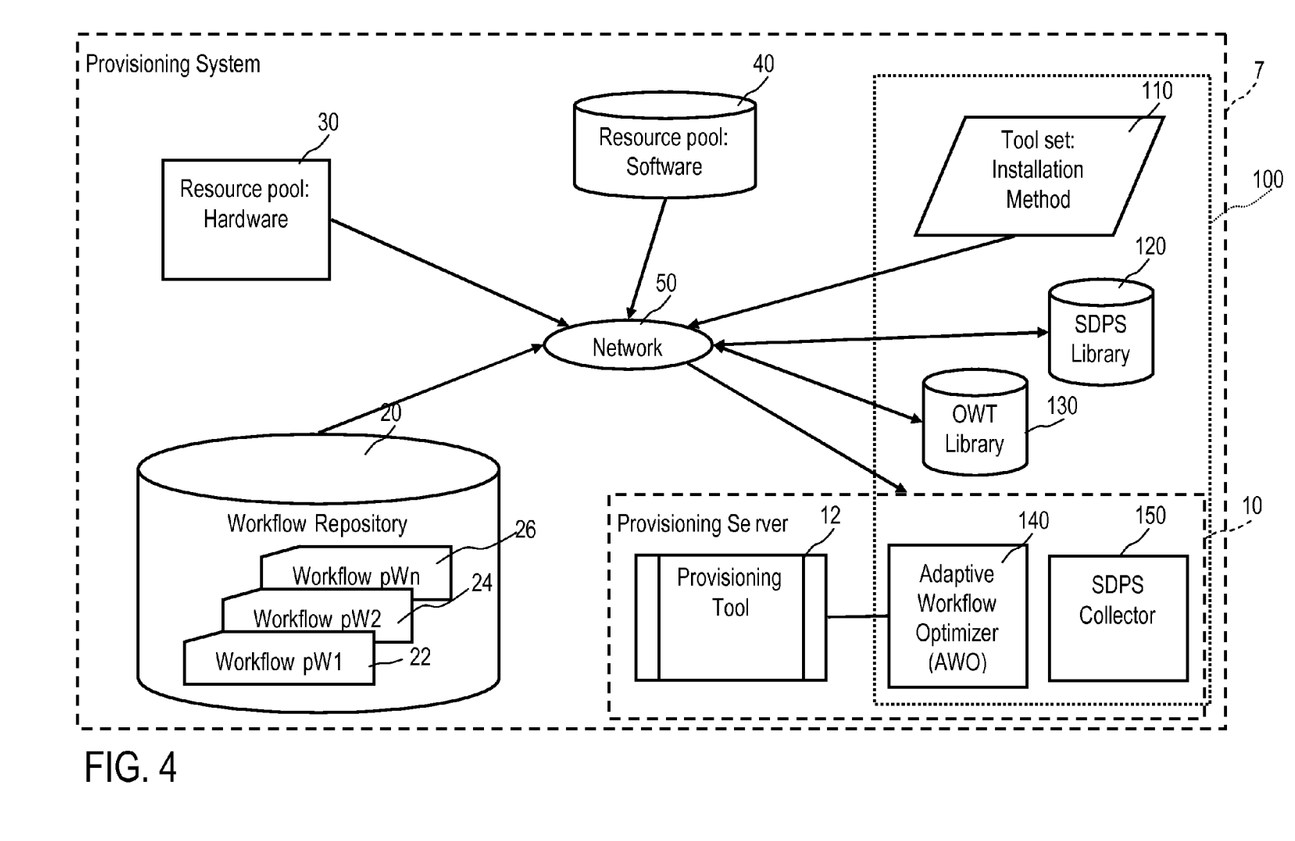
FIG. 4 is a schematic block diagram of a provisioning system for the resource provisioning environment shown in FIG. 1, in accordance with an embodiment of the present invention.
Figure 5:
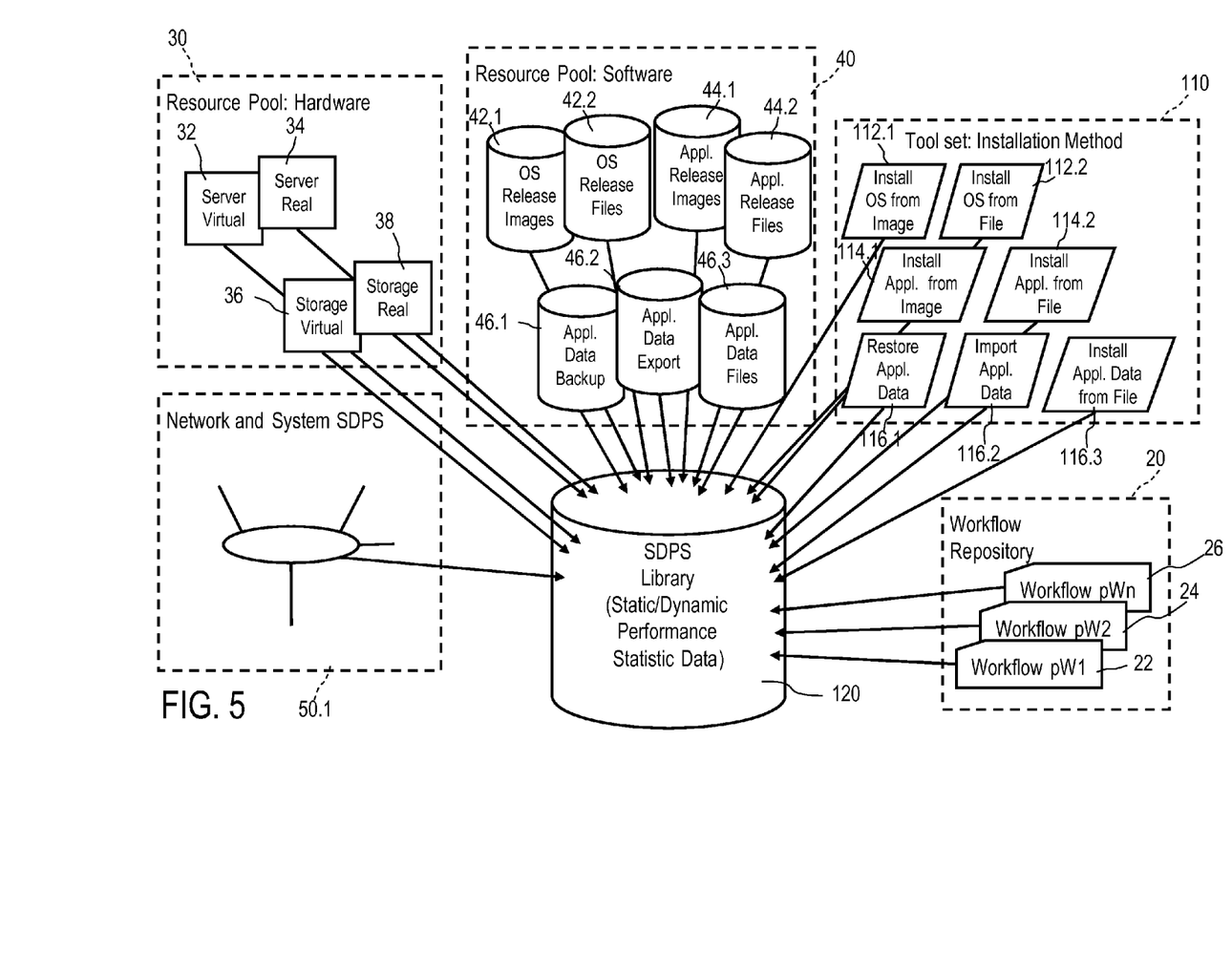
FIG. 5 is a more detailed block diagram of characteristics of components for the provisioning system shown in FIG. 4, in accordance with an embodiment of the present invention.

FIG. 1 shows a resource provisioning environment 1, in accordance with an embodiment of the present invention; FIG. 2 shows a topology tree TT1 of an exemplary provisioning workflow pWn; FIG. 3 shows a topology tree TT1' of an optimized workflow pWn' created from the exemplary provisioning workflow pWn shown in FIG. 2; FIG. 4 shows a provisioning system 7 for the resource provisioning environment 1 shown in FIG. 1, in accordance with an embodiment of the present invention; and FIG. 5 shows characteristics of components for the provisioning system 7 shown in FIG. 4, in accordance with an embodiment of the present invention.

Referring to FIG. 1, in the shown embodiment of the resource provisioning environment 1 comprises the provisioning system 7 which delivers a consumer system 5 on a request of a consumer. In a first step S1 the consumer 3 requests the consumer system 5 from the provisioning system 7. The provisioning system 7 provisions the consumer system 5 in a step S2. The consumer 3 uses the consumer system 5 in a step S3.

Referring to FIG. 4, the provisioning system 7 includes resource pools 30, 40, pre-defined workflows 22, 24, 26 in a workflow repository 20, all connected over a network 50. A provisioning server 10 runs a provisioning tool 12 which utilizes components of the provisioning system 7 over the network 50. A provisioning system extension 100 comprises a tool set of installation methods 110, an optimized workflow template (OWT) library 130, a static and dynamic performance statistic data (SDPS) library 120, an adaptive workflow optimizer (AWO) 140 and a static and dynamic performance statistic data (SDPS) collector 150. The provisioning system 7 runs the provisioning tool 12 on the provisioning server 10 which utilizes resource pools for hardware and software components 30, 40 by executing a pre-defined provisioning workflow 22, 24, 26 from the workflow repository 20.

Still referring to FIG. 4, the adaptive workflow optimizer 140 is invoked by the provisioning tool 12, once a provisioning workflow pWn is going to be executed. The adaptive workflow optimizer 140 determines if an original provisioning workflow pWn is eligible for optimization, or if the original provisioning workflow pWn is intended for immediate execution, or if an optimized provisioning workflow pWn' is ready for execution. If the original provisioning workflow pWn is intended for immediate execution, workflow execution starts immediately in the provisioning tool 12. If the original provisioning workflow pWn is eligible, the adaptive workflow optimizer 140 determines which optimization variant, minimized run-time and resource usage, or within the limits of a contract, is appropriate. According to that result, the adaptive workflow optimizer 140 builds an optimized workflow template (OWT) from the original provisioning workflow pWn. So, the adaptive workflow optimizer 140 builds a tree topology TT1, from the original provisioning workflow pWn, shown in FIG. 2, such that indivisible sub-paths P1, P2, P3, and P4 are identified. During the optimization process the adaptive workflow optimizer 140 combines the indivisible sub-paths P1, P2, P3, P4 by serialization and parallelization, creates an new optimized workflow template (OWT) with optimized tree topology TT1', shown in FIG. 3, and different structure compared to the original provisioning workflow pWn. This new optimized workflow template (OWT) is added to the optimized workflow template library 130 for future reuse. In a final step, the adaptive workflow optimizer 140 builds an optimized provisioning workflow pWn', comprising the optimized tree topology TT1', shown in FIG. 3, by merging the optimized workflow template (OWT) with the data and resources of the original provisioning workflow pWn. The optimized provisioning workflow pWn' is then executed by the provisioning tool 12.

Referring to FIG. 5 the static and dynamic performance statistic data (SDPS) library 120 includes time coefficients of all resource types and aggregated resources 32, 34, 36, 38, 42.1, 42.2, 44.1, 44.2, 46.1, 46.2, 46.3 of the hardware resource pool 30 and the software resource pool 40, time coefficients of all installation methods 112.1, 112.2, 114.1, 114.2, 116.1, 116.2, 116.3 in the tool set 110, time coefficients of all workflows 22, 24, 26 in the workflow repository 20, and actual run-time statistics 50.1 of network bandwidth and throughput, CPU load etc.

Still referring to FIG. 5, the hardware resource pool 30 comprises a virtual server 32, a real server 34, virtual storage 36, and real storage 38, for example. The software resource pool 40 comprises operating system release images 42.1, operating system release files 42.2, application release images 44.1, application release files 44.2, application data backup 46.1, application data export 46.2, and application data files 46.3, for example. The tool set 110 comprises the installation methods of install operating system from image 112.1, install operating system from file 112.2, install application from image 114.1 install application from file 114.2, restore application data 116.1, import application data 116.2, and install application data from file 116.3.

Initially and when new resources, workflows or installations methods are added to the provisioning system 7, or when the provisioning system 7 is reconfigured, e.g. network-wise, pre-defined time-coefficients will be put in the static and dynamic performance statistic data library 120 for those items. Over time, the values will be adapted to run-time circumstances.

Figure 6:
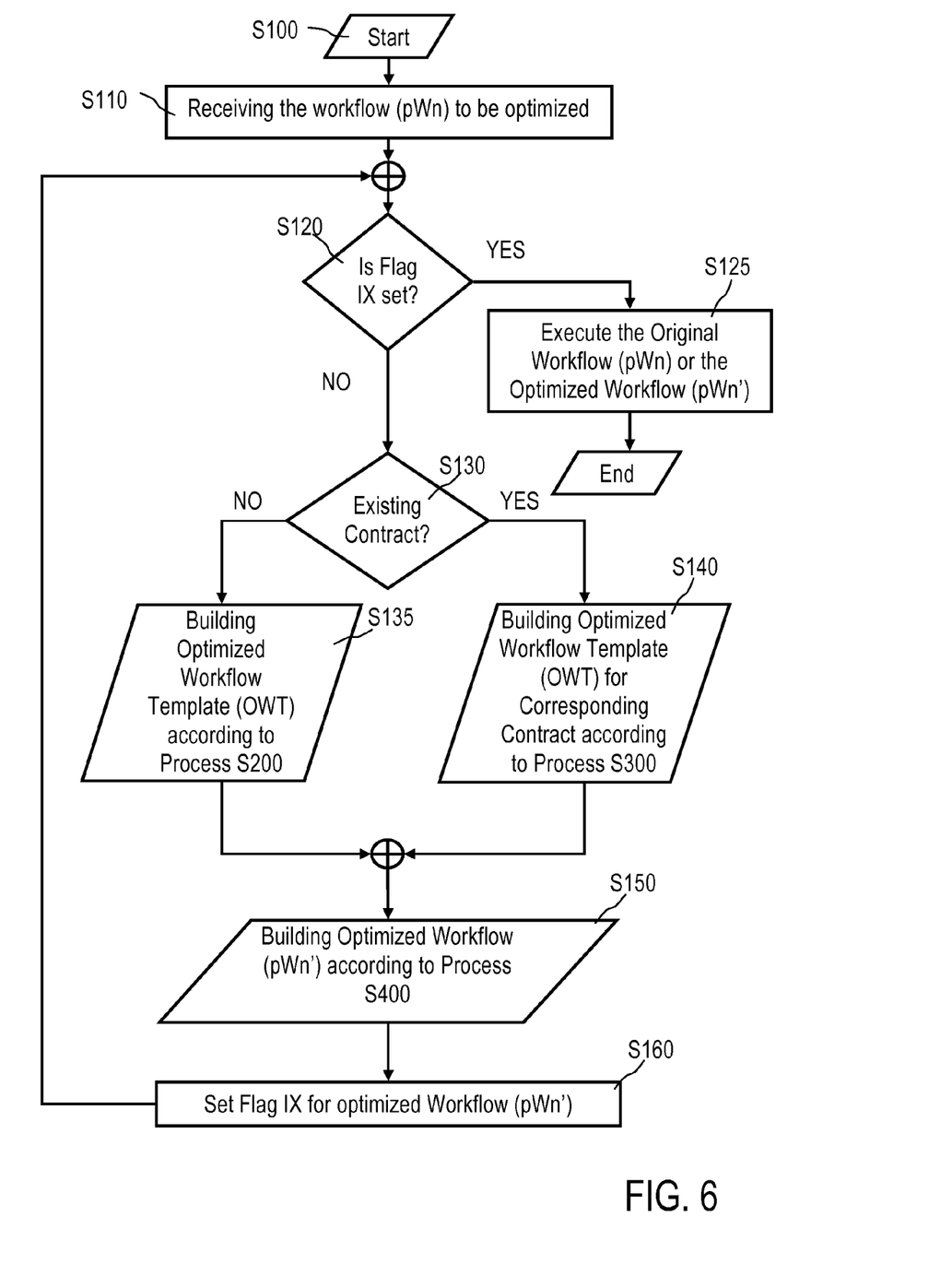
FIG. 6 is a schematic flow diagram of a method for optimizing provisioning workflows in cloud computing, in accordance with an embodiment of the present invention.
Figure 7:
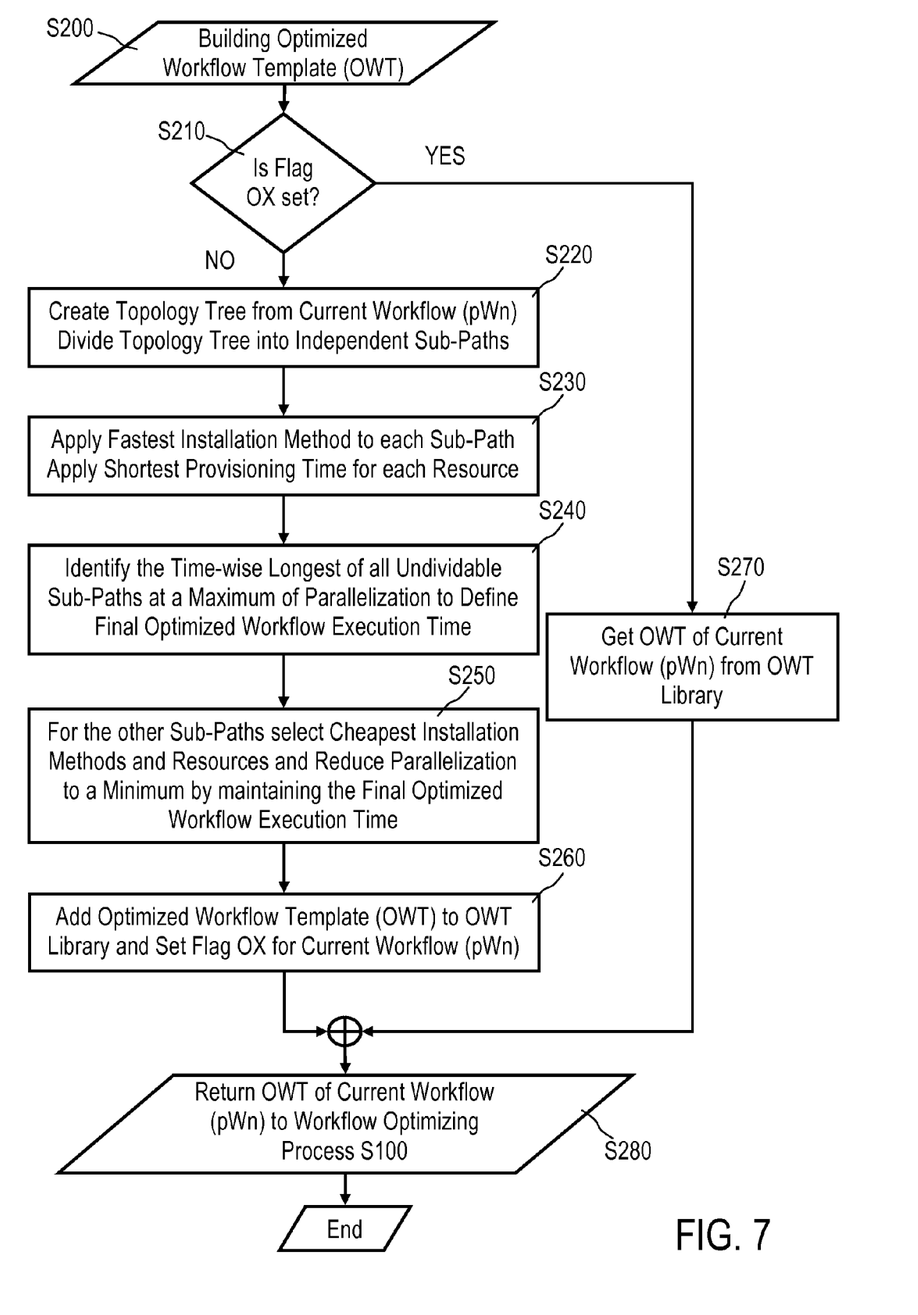
FIG. 7 is a schematic flow diagram of a first optimized workflow template build process for the method for optimizing provisioning workflows in cloud computing shown in FIG. 6, in accordance with an embodiment of the present invention.
Figure 8:
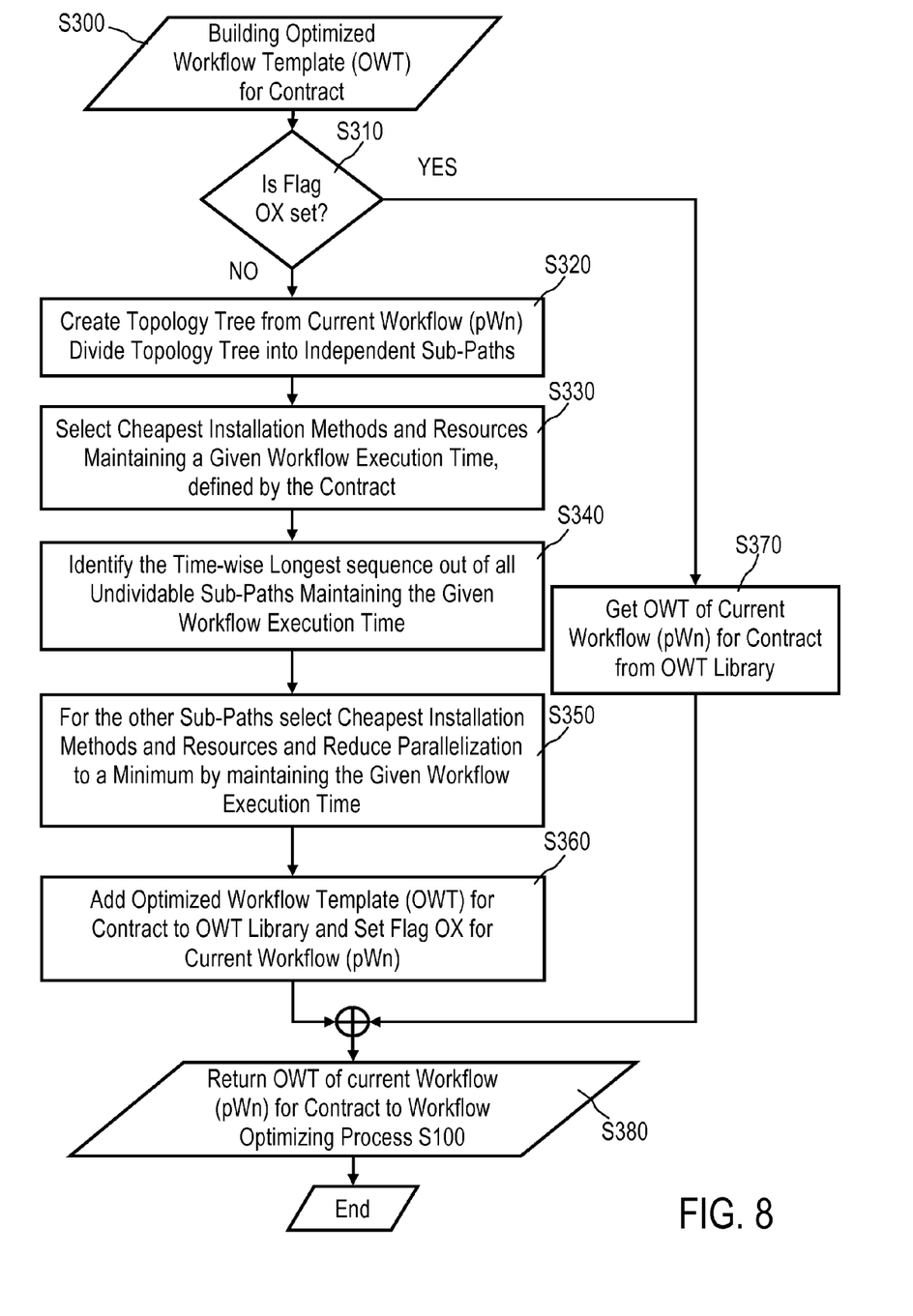
FIG. 8 is a schematic flow diagram of a second optimized workflow template build process for the method for optimizing provisioning workflows in cloud computing shown in FIG. 6, in accordance with an embodiment of the present invention.
Figure 9:
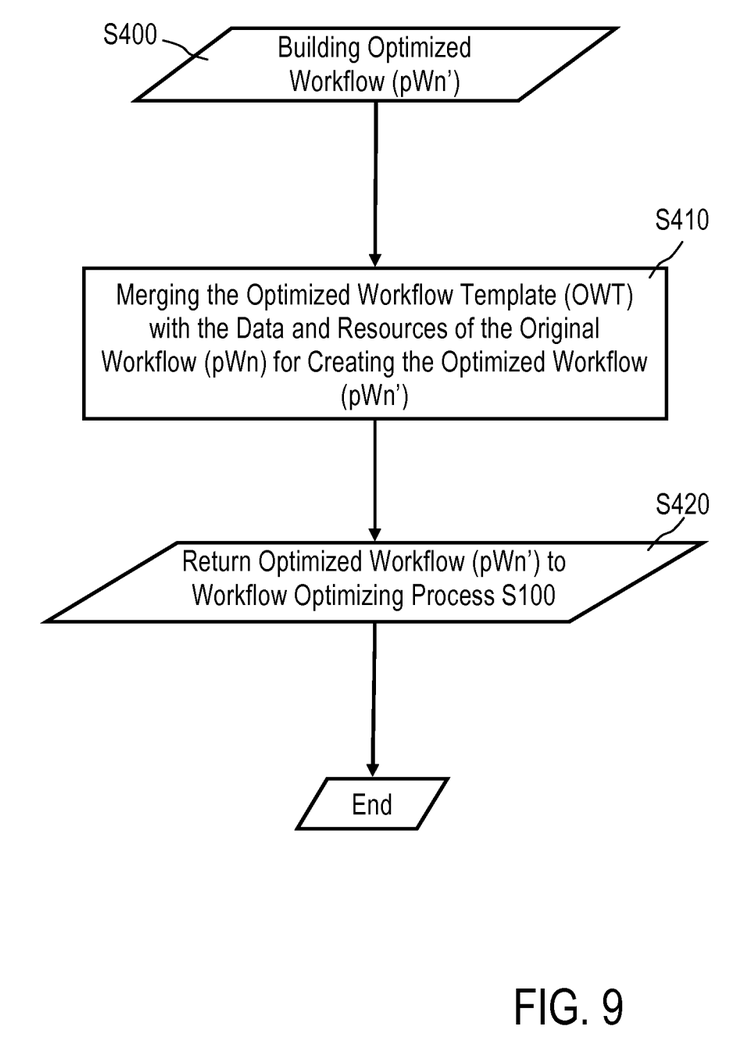
FIG. 9 is a schematic flow diagram of an optimized workflow build process for the method for optimizing provisioning workflows in cloud computing shown in FIG. 6, in accordance with an embodiment of the present invention.
Figure 10:
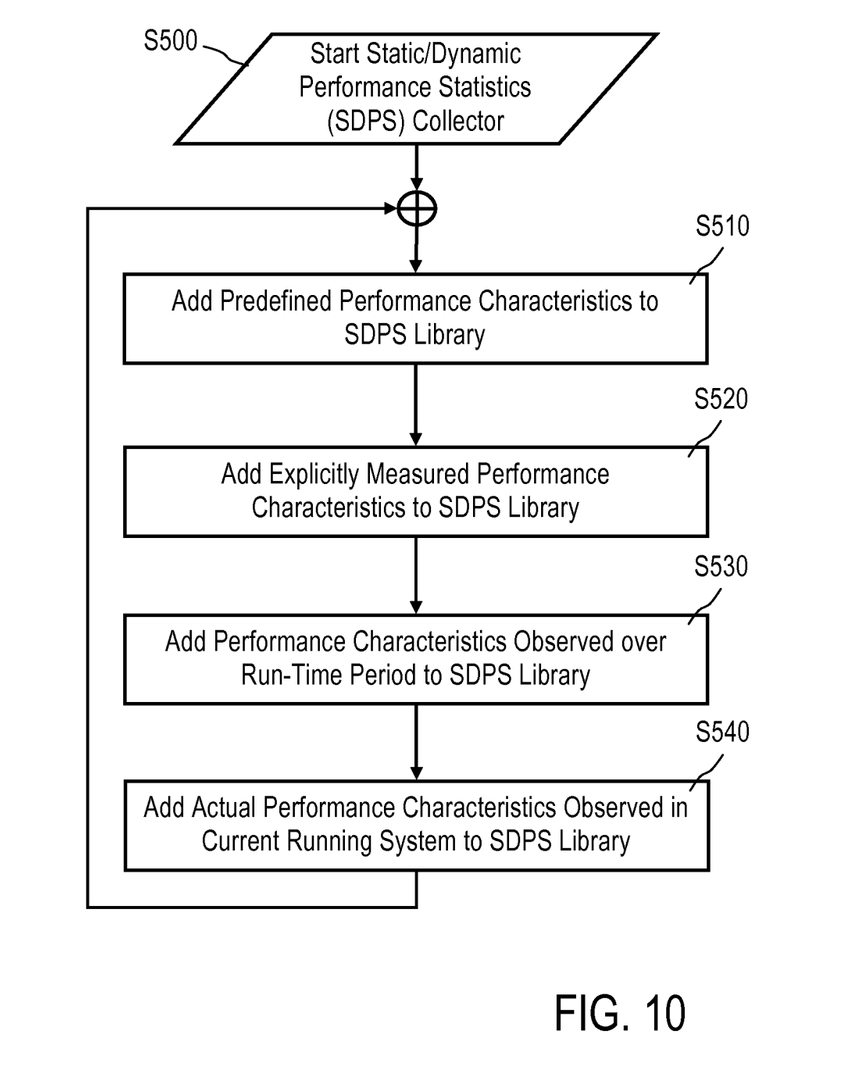
FIG. 10 is a schematic flow diagram of a static and dynamic performance statistic data collection process, in accordance with an embodiment of the present invention.

FIG. 6 shows a method for optimizing provisioning workflows in cloud computing, in accordance with an embodiment of the present invention; FIG. 7 shows a first optimized workflow template build process for the method for optimizing provisioning workflows in cloud computing shown in FIG. 6, in accordance with an embodiment of the present invention; FIG. 8 shows a second optimized workflow template build process for the method for optimizing provisioning workflows in cloud computing shown in FIG. 6, in accordance with an embodiment of the present invention; FIG. 9 shows an optimized workflow build process for the method for optimizing provisioning workflows in cloud computing shown in FIG. 6, in accordance with an embodiment of the present invention; and FIG. 10 shows a static and dynamic performance statistic data collection process, in accordance with an embodiment of the present invention.

Referring to FIG. 6, in step S100 the provisioning tool 12 starts the adaptive workflow optimizer 140 receiving a provisioning workflow pWn to be optimized in step S110. In step S120, it is tested if a flag IX is set for the current provisioning workflow pWn or not. The flag IX can be pre-set by the provisioning tool 12. If the flag IX is set, immediate execution of the current provisioning workflow pWn is triggered in the provisioning tool 12 in step S125, which exits the process of the adaptive workflow optimizer 140. If the flag IX is not set, optimization of the current provisioning workflow pWn is intended. Test S130 determines the optimization method for building the optimized workflow template OWT. The test result of step S130 might either be optimization following a standard method in step S135, e.g. fastest provisioning by minimized resource usage, or the result might be optimization according to contractual obligations in step S140, e.g. considering the rules and limitations of a service level agreement. According to step S135 the first optimized workflow template build process, shown in FIG. 7, is started, and according to step S140 a second optimized workflow template build process, shown in FIG. 8, is started. Once the first optimized workflow template build process or the second optimized workflow template build process are finished, an optimized provisioning workflow pWn' is built in step S150 by merging the optimized workflow template OWT from the first optimized workflow template build process or the second optimized workflow template build process with the data and resources of the original provisioning workflow pWn. In step S160, the flag IX is set for the optimized provisioning workflow pWn' and the process continues with test S120. Since the flag IX is set, the optimized provisioning workflow pWn' is transferred to the provisioning tool 12 for execution in step S125, which exits the process of the adaptive workflow optimizer 140.

Referring to FIG. 7, the first optimized workflow template build process representing the standard optimization process for the current provisioning workflow pWn is started in step S200. In step S210 a flag OX is tested. The flag OX can be pre-set by the provisioning tool 12. If the flag OX is set, an optimized workflow template OWT for the current provisioning workflow pWn already exists in the optimized workflow template library 130. A function S270 gets the optimized workflow template OWT for the current provisioning workflow pWn from the optimized workflow template library 130 and returns it to the adaptive workflow optimizer 140.

If the flag OX is not set, processing continues with step S220. In step S220 the adaptive workflow optimizer 140 creates a topology tree TT1 from the current provisioning workflow pWn, shown in FIG. 2, and divides the topology tree TT1 comprising activities A1 to A11 into its independent sub-paths P1, P2, P3, P4, wherein a first sub-path P1 comprises activities A3, and A8, a second sub-path P2 comprises activities A4 and A5, a third sub-path P3 comprises activities A6, A7, and A9, and a fourth sub-path P4 comprises the activity A10. The activities A1, A2, and A11 are common to all sub-paths P1, P2, P3 and P4. In step S230, the adaptive workflow optimizer 140 gets time coefficients from static and dynamic performance statistic data library 120 and determines for each of the sub-paths P1, P2, P3, P4 fastest installation method and resources with the shortest provisioning time. In step S240 the adaptive workflow optimizer 140 identifies the time-wise longest indivisible sub-path P3 by a maximum of parallel processing of all sub-paths P1, P2, P3, P4, which yields the final shortest execution time of the optimized workflow template (OWT). In step S250 the adaptive workflow optimizer 140 assigns the cheapest installation methods and the cheapest resources to the remaining sub-paths P1, P2, P4 and reduces the overall parallelization to a minimum, by maintaining the final shortest execution time of the new optimized workflow template OWT for the current provisioning workflow pWn, determined in step S240. Referring to FIG. 3 the parallelization is minimized to three sub-paths P1, P2' and P3, wherein a first sub-path P1 comprises activities A3, and A8, a second sub-path P2' comprises activities A4, A5, and A10, and a third sub-path P3 comprises activities A6, A7, and A9. The activities A1, A2, and A11 are common to all sub-paths P1, P2', and P3. In step S260, the optimized workflow template OWT is persistently added to the optimized workflow template library 130 for future re-use, and the flag OX is set for the current provisioning workflow pWn.

In step S280 the optimized workflow template OWT for the current provisioning workflow pWn is returned as result of the first optimized workflow template build process to step S135 of the method for optimizing provisioning workflows in cloud computing.

Referring to FIG. 8, the second optimized workflow template build process representing the contractually conditioned optimization process for the current provisioning workflow pWn is started in step S300. In step S310 the flag OX is tested. If the flag OX is set, an optimized workflow template OWT for a corresponding contract for the current workflow pWn already exists in the optimized workflow template library 130. A function S370 gets the optimized workflow template OWT for the corresponding contract for the current provisioning workflow pWn from the optimized workflow template library 130 and returns it to the adaptive workflow optimizer 140.

If the flag OX is not set, processing continues with step S320. In step S320 the adaptive workflow optimizer 140 creates a topology tree TT1 from the current provisioning workflow pWn, shown in FIG. 2, and divides the topology tree TT1 comprising activities A1 to A11 into its independent sub-paths P1, P2, P3, P4, wherein a first sub-path P1 comprises activities A3, and A8, a second sub-path P2 comprises activities A4 and A5, a third sub-path P3 comprises activities A6, A7, and A9, and a fourth sub-path P4 comprises the activity A10. The activities A1, A2, and A11 are common to all sub-paths P1, P2, P3 and P4. In step S330, the adaptive workflow optimizer 140 gets time coefficients from static and dynamic performance statistic data library 120 and determines for each of the sub-path P1, P2, P3, P4 the cheapest installation method and cheapest resources maintaining the given workflow execution time defined by the contract. In step S340 the adaptive workflow optimizer 140 identifies the time-wise longest sequence of activities out of all sub-paths P1, P2, P3, P4 which maintains the given workflow execution time and yields the final execution time of the optimized workflow template OWT. Here the sub-path P3 has the time-wise longest sequence of activities. In step S350 the adaptive workflow optimizer 140 assigns the cheapest installation methods and the cheapest resources to the remaining sub-paths P1, P2, P4 and reduces the overall parallelization to a minimum, by maintaining the final execution time of the new optimized workflow template OWT for the corresponding contract for the current provisioning workflow pWn, determined in step S340. Referring to FIG. 3 the parallelization is minimized to three sub-paths P1, P2' and P3, wherein a first sub-path P1 comprises activities A3, and A8, a second sub-path P2' comprises activities A4, A5, and A10, and a third sub-path P3 comprises activities A6, A7, and A9. The activities A1, A2, and A11 are common to all sub-paths P1, P2', and P3. In step S360, the optimized workflow template OWT for the corresponding contract is persistently added to the optimized workflow template library 130 for future re-use, and the flag OX is set for the current provisioning workflow pWn.

In step S380 the optimized workflow template OWT for the corresponding contract for the current provisioning workflow pWn is returned as result of the second optimized workflow template build process to step S140 of the method for optimizing provisioning workflows in cloud computing.

Referring to FIG. 9, the optimized workflow building process for the optimized provisioning workflow pWn' is started in step S400. In step S410, the optimized provisioning workflow pWn' is created by merging the optimized workflow template OWT with the data and resources of the original provisioning workflow pWn. In step S420, the optimized provisioning workflow pWn' is returned to step S150 of the method for optimizing provisioning workflows in cloud computing.

Referring to FIG. 10, a static and dynamic performance statistic data collection process performed by the static and dynamic performance statistic data collector 150 is started in step S500. The static and dynamic performance statistic data collector 150 is started with the adaptive workflow optimizer 140, but and runs independently from the adaptive workflow optimizer 140. The static and dynamic performance statistic data collector 150 updates the static and dynamic performance statistic data library 120 with static and dynamic performance data derived from the provisioning system 7. In step S510, the static and dynamic performance statistic data collector 150 adds static time-coefficients, e.g. by manually input of pre-defined data into the static and dynamic performance statistic data library 120. In step S520, the static and dynamic performance statistic data collector 150 adds more accurate static time-coefficients by performing explicit measurements of workflow execution time and using those results as input for the static and dynamic performance statistic data library 120. In step S530, the static and dynamic performance statistic data collector 150 uses monitoring techniques to obtain time-coefficients of components in use during regular operation of the provisioning system 7. This long-term dynamic data is also input to the static and dynamic performance statistic data library 120. In step S540, the static and dynamic performance statistic data collector 150 collects short-term performance data like network bandwidth, throughput or CPU load and puts it in the static and dynamic performance statistic data library 120. An average time-coefficient of a recent time period may be calculated and may be made available in the static and dynamic performance statistic data library 120, e.g. network throughput average in the last 30 minutes. The steps S510 to S540 may be executed independently from each other.

The inventive method for optimizing provisioning workflows in cloud computing can be implemented as an entirely software embodiment, or an embodiment containing both hardware and software elements. In one embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include Compact Disc-read only memory (CD-ROM), Compact Disc-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for optimizing provisioning workflows in cloud computing, comprising:
    determining a time coefficient for each resource type or aggregated resource types which define the installation time of a current workflow;
    accessing said current workflow and creating a tree topology based on said current workflow which defines serialized and parallelized provisioning steps;
    dividing said tree topology into independent sub-paths;
    determining a timing condition for an execution time of an optimized workflow; and
    creating an optimized workflow template maintaining said timing condition by:
        selecting cheapest installation methods and cheapest resources;
        reducing said parallelization of said tree topology by reducing the independent sub-paths to a minimum number of independent sub-paths; and
        creating said optimized workflow by merging said optimized workflow template with data and said resource types of said current workflow.

2. The method according to claim 1, wherein a first timing condition for an execution time of an optimized workflow is determined as final optimized workflow execution time.

3. The method according to claim 2, wherein said first timing condition for an execution time of an optimized workflow is determined by:
    applying fastest installation method to each independent sub-path;
    applying shortest provisioning time for each resource type; and
    identifying a time-wise longest undividable sub-path at a maximum of said parallelization of said tree topology defining said final optimized workflow execution time.

4. The method according to claim 1, wherein a second timing condition for an execution time of an optimized workflow is determined as optimized workflow execution time defined by a contract.

5. The method according to claim 4, wherein a time-wise longest undividable sub-path is identified maintaining said second timing condition for an execution time of an optimized workflow.

6. The method according to claim 1, wherein said time coefficient for each resource type or aggregated resource types is derived and collected as static and dynamic performance data.

7. The method according to claim 6, wherein static performance data is collected by manually input of pre-defined data and/or by performing explicit measurements of workflow execution time.

8. The method according to claim 6, wherein long-term dynamic data are collected by using monitoring techniques to obtain time-coefficients of components during regular operation; and wherein short-term performance data are collected by using monitoring techniques to obtain network bandwidth, throughput or CPU load during current operation.

9. A system for optimizing provisioning workflows in cloud computing, the system comprising:
    a provisioning server with a provisioning tool, a workflow repository storing at least one workflow, a hardware resource pool comprising at least one hardware resource, a software resource pool comprising at least one software resource and a provisioning system extension comprising a tool set of at least one installation method, an adaptive workflow optimizer, and a static and dynamic performance statistic data collector;
    wherein said static and dynamic performance statistic data collector determines a time coefficient for each resource type or aggregated resource types which define the installation time of a current workflow;
    wherein said adaptive workflow optimizer accesses said current workflow and creates a tree topology based on said current workflow which defines serialized and parallelized provisioning steps;
    divides said tree topology into independent sub-paths;
    determines a timing condition for an execution time of an optimized workflow;
    creates an optimized workflow template and maintains said timing condition by:
        selecting cheapest installation methods from said tool set of at least one installation method;
        selecting cheapest resources from said hardware resource pool and said software resource pool; and
        reducing said parallelization of said tree topology by reducing the independent sub-paths to a minimum number of independent sub-paths;
    wherein said adaptive workflow optimizer stores said optimized workflow template in an optimized workflow template library, and
    wherein said adaptive workflow optimizer creates said optimized workflow by merging said optimized workflow template with data and said resource types of said current workflow.

10. The system according to claim 9, wherein said adaptive workflow optimizer determines a first timing condition for an execution time of an optimized workflow as final optimized workflow execution time by:
    applying fastest installation method to each independent sub-path;
    applying shortest provisioning time for each resource; and identifying a time-wise longest undividable sub-path at a maximum of said parallelization of said tree topology defining said final optimized workflow execution time.

11. The system according to claim 9, wherein said adaptive workflow optimizer determines a second timing condition for an execution time of an optimized workflow as optimized workflow execution time defined by a contract, wherein said adaptive workflow optimizer identifies a time-wise longest undividable sub-path maintaining said second timing condition for an execution time of an optimized workflow.

12. The system according to claim 9, wherein said static and dynamic performance statistic data collector derives and collects said time coefficient for each resource type or aggregated resource types as static and dynamic performance data, wherein said static and dynamic performance statistic data collector stores said static and dynamic performance data in a static and dynamic performance statistic data library.

13. The system according to claim 12, wherein said static and dynamic performance statistic data collector collects said static performance data as manually input pre-defined data and/or by performing explicit measurements of workflow execution time, wherein said static and dynamic performance statistic data collector collects long-term dynamic data by using monitoring techniques to obtain time-coefficients of components during regular operation; and wherein said static and dynamic performance statistic data collector collects short-term performance data by using monitoring techniques to obtain network bandwidth, throughput or CPU load during current operation.

14. A computer program product for optimizing provisioning workflows in cloud computing, the computer program product comprising:
a computer-readable storage medium readable by a processor and storing instructions for execution by the processor for performing a method comprising:
determining a time coefficient for each resource type or aggregated resource types which define the installation time of a current workflow;
accessing said current workflow and creating a tree topology based on said current workflow which defines serialized and parallelized provisioning steps;
dividing said tree topology into independent sub-paths;
determining a timing condition for an execution time of an optimized workflow; and
creating an optimized workflow template maintaining said timing condition by:
selecting cheapest installation methods and cheapest resources;
reducing said parallelization of said tree topology by reducing the independent sub-paths to a minimum number of independent sub-paths; and
creating said optimized workflow by merging said optimized workflow template with data and said resource types of said current workflow.

* * * * *